3,027,353
PRODUCTION OF POLYTHIOETHERS AND
POLYURETHANES THEREFROM
Hans Holtschmidt, Koln-Stammheim, Germany, assignor, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Aug. 21, 1957, Ser. No. 679,541
Claims priority, application Germany Aug. 24, 1956
9 Claims. (Cl. 260—77.5)

This invention relates to a process for producing polycondensation products. More particularly, the invention is concerned with a process for the production of polythioethers containing terminal hydroxyl groups.

It is well known in the art to prepare polythioethers by condensing alkylene glycols with thioether glycols in the presence of etherification catalysts. This reaction which can be represented by the following equation:

$x$HO-alkylene-OH + $x$HO-alkylene-S-alkylene-OH →
  HO-(alkylene-O-alkylene-S-alkylene-O)$_x$H + $x$H$_2$O where $x$ is an integer, leads to products which contain both oxygen and sulfur bridging atoms, the molar percentage of the ether oxygen atoms being greater than the molar percentage of the sulfur ether atoms. Attempts to make polythioethers having a higher content of sulfur bridging atoms by thermal condensation of a thioether alone have thus far been unsatisfactory. If thiodiglycol is heated in the presence of a conventional etherification catalyst, such as p-toluene sulfonic acid or sulfuric acid, the yield of the corresponding polythioether amounts to only 40% to 60% while the balance of the starting material undergoes ring closure reactions resulting in the formation of thioxan

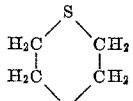

and dithian

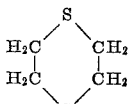

the latter being formed by liberation of 2 mols of ethylene oxide and 2 mols of water from 2 mols of thiodiglycol. Moreover, the polythioethers thus obtained have a dark color due to the presence of by-products and are not suitable for use in the production of plastics. In addition, this reaction is difficult to control and to carry to the desired molecular weight or hydroxyl number of the polycondensation product since due to the side reactions the amount of the split-off water is no measure of the degree of condensation.

It is, therefore, a primary object of the present invention to provide a process for the production of polythioethers containing a relatively high percentage of sulfur atoms which results in high yields. Another object of the present invention is to provide a process for the production of polythioethers rich in sulfur atoms which can be easily controlled. A further object of the invention is to provide a process for the production of polythioethers containing terminal hydroxyl groups and a relatively large number of sulfur bridging atoms which are suitable for use in the production of plastics. A further object of the invention is to provide a process for the production of polythioethers from thiodiglycol. Still further objects will appear hereinafter.

These objects are accomplished in accordance with the present invention by heating thiodiglycol in the presence of a catalyst containing a phosphoric acid or an acid phosphoric acid derivative. The invention is based on the discovery that phosphoric acids and acid phosphoric acid derivatives exert a specific catalytic effect on the condensation of thiodiglycol in that the reaction is directed almost exclusively to the formation of the linear polycondensation product whereas the formation of cyclic condensation products, such as thioxan and dithian, is almost completely suppressed.

The process of the invention makes it possible to obtain the linear polycondensation product of thiodiglycol having the formula

HO-(alkylene-S-alkylene-O-alkylene-S-alkylene-O)$_y$H where $y$ is an integer in yields up to 90% to 98% of the theoretical, the amount of cyclic by-products being negligible. More specifically as to the cyclic by-products, only a minor amount of thioxan is formed in the process of the invention while no formation of dithian at all takes place. The latter fact is particularly important since it is extremely difficult to deodorize polycondensation products containing a substantial quantity of dithian. Another advantage of the polythioethers obtainable by the process of the invention is the light color of these products which permits their use in many applications not available to the heretofore known relatively dark polythioethers.

Among the phosphoric acids which may be used as catalysts in the process of the invention are both ortho- and metaphosphoric acid as well as all other common phosphoric and pyrophosphoric acids including mixtures of phosphorus pentoxide and orthophosphoric acid. Furthermore, any suitable acid phosphoric acid derivative may be used as the catalyst in the process of the invention, representative examples being acid phosphates and acid phosphoric acid esters, having the formula

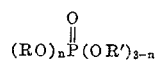

$$(RO)_nP(OR')_{3-n}$$

wherein R is a hydrocarbon or halohydrocarbon radical, R' is the same as R or hydrogen and $n$ is an integer of from 1 to 3, such as sodium dihydrogen phosphate, potassium dihydrogen phosphate, ammonium dihydrogen phosphate, iron phosphate, triethylphosphate, triphenylphosphate, triallylphosphate, trichloroethylphosphate, methyldiethylphosphate, phosphoric acid diethylester, phosphoric acid monobutylester, and tricyclohexylphosphate. It should be noted that neutral esters which decompose under the reaction conditions to give acid esters are operative in the process of the invention.

Any suitable amount of catalyst may be used but usually the catalyst is used in an amount of from about 0.1% to about 10% by weight, based on the weight of the starting material. A preferred concentration range is from about 0.5% to about 1% by weight. It is particularly advantageous to utilize a water-soluble phosphoric acid catalyst, which can be removed from the reaction product by washing with water.

The condensation reaction in accordance with the present invention is carried out at such a temperature as will provide a reasonable reaction velocity. Although at temperatures as low as 100° C. a noticeable reaction takes place, it is preferred to operate at temperatures above 100° C., the range from about 150° C. to about 200° C. being particularly advantageous. Temperatures which lie considerably higher than 250° C. are less suitable since they will cause side reactions to take place.

The invention also contemplates the condensation of mixtures of thiodiglycol with polyhydric alcohols in the presence of a phosphoric acid or acid phosphoric acid derivative catalyst. The concurrent use of polyhydric alcohols is of particular interest where it is desired to produce branched polythioethers. Any suitable polyhydric alcohol may be used, such as trimethylol propane, glycerin, hexanetriol, mannitol, pentaerythritol. Thus, a mixture of thiodiglycol and trimethylol propane will yield a branched polythioether containing terminal hydroxyl groups when reacted in accordance with this invention.

In carrying out the process of the invention, it is advisable to operate in the absence of oxygen. This can be done by passing nitrogen or another inert gas through the reaction vessel.

As in all etherification reactions, the degree of condensation or the molecular weight of the product formed can be ascertained from the amount of water split off in the reaction. The molecular weight of the polythioethers of the instant invention can, therefore, be controlled by discontinuing the heating when the calculated amount of water has distilled over. If desired, the final stage of the condensation reaction can be conducted under reduced pressure. The final stage is reached when monomeric thiodiglycol is no longer present in the reaction mixture or, in other words, when the thiodiglycol molecule is at least once etherified with another molecule.

The polythioethers obtainable by the process of the invention, thanks to their terminal hydroxyl groups, light color and relatively hydrophobic character, are useful as starting materials for the production of plastics. Thus, they may be reacted with polyisocyanates to form polyurethane plastics which may take the form of rubber-like materials, elastic or rigid foams, coatings and impregnations. The polyurethane plastics have many uses, such as for making vehicle tires, sponges and insulation. Preferably, the polythioethers should have a molecular weight of at least about 800 and it may be as great as about 10,000 or more.

The following examples further illustrate the process of the invention without restricting it.

*Example 1*

29.3 parts by weight of crystallized orthophosphoric acid are added to 5856 parts by weight of thiodiglycol. The mixture is thereafter heated to 180° C. while stirring and while passing a current of nitrogen and is then condensed until 730 cc. of water are split off. A yellow oil is obtained, which is completely insoluble in water and has an hydroxyl number of 312. The phosphoric acid can be removed by washing the reaction product with water. The yield is 97.5% of the theoretical.

*Example 2*

Using the same batch as in Example 1, 30 g. of pyrophosphoric acid are used as catalyst and condensation is carried out until 850 cc. of water are split off. A water jet vacuum is then applied for 3 hours at 180° C. and a reaction product is obtained with a yield of 91.4%, this product solidifying at room temperature to form a whitish yellow wax-like substance and having an hydroxyl number of 110.

*Example 3*

If the same batch is condensed for 3 hours longer in vacuo, using 40 g. of monosodium dihydrogenphosphate, a polythioether with an hydroxyl number of 50 is obtained with a yield of 90%, this substance also being a waxy substance with a softening point of 50° C.

*Example 4*

26 parts by weight of orthophosphoric acid are added to 5856 parts by weight of thiodiglycol mixed with 3% of trimethylol propane. While passing a current of nitrogen and while stirring vigorously, the condensation mixture is heated to 180° C. and is kept at this temperature until an hydroxyl number of 60 is reached. A thickly liquid oil is obtained. The catalyst can, if required, be removed by washing with water.

*Example 5*

300 parts by weight of the polythioether obtained according to the procedure of Example 3 are mixed with 192 parts by weight of 4,4'-diphenylmethanediisocyanate at a temperature of 120° C. The temperature rises to 130° C. After a reaction time of 7 minutes the mixture is cooled down to 100° C. and a mixture consisting of 50 parts by weight of 1,4-butyleneglycol and 3 parts by weight of N-methyldiethanolamine added. The reaction mixture is cast into molds and heated to 100° C. for 20 hours. A rubber-elastic material is obtained showing the following mechanical properties:

| | |
|---|---|
| Elasticity | percent__ 45 |
| Tearing strength | kg./cm.² __ 220 |
| Breaking elongation | percent__ 420 |
| Shore hardness | deg__ 95 |
| Resistance to needle scratching | kg./cm.__ 120 |
| Loading at 300% elongation | kg./cm.² __ 160 |

Although certain representative embodiments and details have been shown for the purpose of illustrating this invention, it will be apparent to those skilled in the art that various changes and modifications may be made therein without departing from the spirit and scope of the invention except as set forth in the claims.

What is claimed is:

1. A process for the preparation of a polythioether which is a homopolymer of thiodiglycol which comprises heating a polyhydric alcohol consisting essentially of thiodiglycol to a temperature of from about 100° C. to about 250° C. while mixed with a catalytic amount of a catalyst selected from the group consisting of phosphoric acids, acid phosphates and acid phosphoric acid esters having the formula

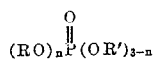

wherein R is selected from the group consisting of hydrocarbon radicals and halohydrocarbon radicals, R' is selected from the group consisting of R as defined above and hydrogen and *n* is an integer of from 1 to 3.

2. A process for the preparation of a polythioether which is a homopolymer of thiodiglycol which comprises heating a polyhydric alcohol consisting essentially of thiodiglycol to a temperature of from about 100° C. to about 250° C. while mixed with a catalytic amount of a phosphoric acid until a polythioether having a molecular weight of at least about 800 is obtained.

3. A process for the preparation of a polythioether which is a homopolymer of thiodiglycol which comprises heating a polyhydric alcohol consisting essentially of thiodiglycol to a temperature of from about 100° C. to about 250° C. while mixed with a catalytic amount of an acid phosphate until a polythioether having a molecular weight of at least about 800 is obtained.

4. A process for the preparation of a polythioether which is a homopolymer thiodiglycol which comprises heating a polyhydric alcohol consisting essentially of thiodiglycol to a temperature of from about 100° C. to about 250° C. while mixed with a catalytic amount of an acid phosphoric acid ester having the formula

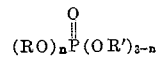

wherein R is selected from the group consisting of hydrocarbon radicals and halohydrocarbon radicals, R' is selected from the group consisting of R as defined above and hydrogen and *n* is an integer of from 1 to 3, until a polythioether having a molecular weight of at least about 800 is obtained.

5. The process of claim 1 wherein said thiodiglycol is mixed with up to about 3 percent by weight of a polyhydric alcohol having at least three hydroxyl groups.

6. The process of claim 1 wherein said thiodiglycol is mixed with up to about 3 percent by weight of trimethylol propane.

7. The process of claim 1 wherein the amount of said catalyst is from about 0.1 percent to about 10 percent by weight.

8. The light colored polythioether substantially free from thioxan and dithian which comprises a homopolymer of thiodiglycol prepared by heating a polyhydric alcohol consisting essentially of thiodiglycol to a temperature of from about 100° C. to about 250° C. while mixed with a catalytic amount of a catalyst selected from the group consisting of phosphoric acids, acid phosphates and acid phosphoric acid esters having the formula $$(RO)_n\overset{O}{\underset{\|}{P}}(OR')_{3-n}$$

wherein R is selected from the group consisting of hydrocarbon radicals and halohydrocarbon radicals, R' is selected from the group consisting of R as defined above and hydrogen and $n$ is an integer of from 1 to 3.

9. A light colored polyurethane plastic substantially free from the odor of thioxan and dithian and containing phosphorous which comprises the reaction product of an organic polyisocyanate with a polyhydric polyalkylene thioether which is a thiodiglycol homopolymer prepared by a process which comprises heating a polyhydric alcohol consisting essentially of thiodiglycol to a temperature of from about 100° C. to about 250° C. while mixed with a catalytic amount of a catalyst selected from the group consisting of phosphoric acid, acid phosphates and acid phosphoric acid esters having the formula $$(RO)_n\overset{O}{\underset{\|}{P}}(OR')_{3-n}$$

wherein R is selected from the group consisting of hydrocarbon radicals and halohydrocarbon radicals, R' is selected from the group consisting of R as defined above and hydrogen and $n$ is an integer of from 1 to 3.

References Cited in the file of this patent
UNITED STATES PATENTS

| | | |
|---|---|---|
| 2,378,576 | Okita | June 19, 1945 |
| 2,518,245 | Morris et al. | Aug. 8, 1950 |
| 2,853,472 | Schroeder et al. | Sept. 23, 1958 |
| 2,900,368 | Stilmar | Aug. 18, 1959 |